United States Patent
Agrawal

(10) Patent No.: US 8,825,736 B2
(45) Date of Patent: Sep. 2, 2014

(54) SYSTEM AND METHOD FOR SERVICE PROVIDER SEARCH

(75) Inventor: Bal Agrawal, Chappaqua, NY (US)

(73) Assignee: Lifeworx, Inc., Chappaqua, NY (US)

( * ) Notice: Subject to any disclaimer, the term of this patent is extended or adjusted under 35 U.S.C. 154(b) by 1494 days.

(21) Appl. No.: 11/376,642

(22) Filed: Mar. 14, 2006

(65) Prior Publication Data

US 2007/0220123 A1 Sep. 20, 2007

(51) Int. Cl.
*G06F 15/16* (2006.01)
*G06F 15/173* (2006.01)
*G06Q 40/00* (2012.01)
*G06Q 30/00* (2012.01)

(52) U.S. Cl.
USPC ........... 709/203; 709/202; 709/217; 709/219; 709/223; 709/226; 705/9; 705/26; 705/37

(58) Field of Classification Search
USPC ................ 709/217, 223, 203, 202, 226, 219; 705/9, 26, 37
See application file for complete search history.

(56) References Cited

U.S. PATENT DOCUMENTS

| | | | |
|---|---|---|---|
| 5,943,652 A | 8/1999 | Sisley et al. | |
| 6,026,375 A | 2/2000 | Hall et al. | |
| 6,115,754 A | 9/2000 | Landgren | |
| 6,202,023 B1 | 3/2001 | Hancock et al. | |
| 6,957,393 B2 | 10/2005 | Fano et al. | |
| 6,968,513 B1 | 11/2005 | Rinebold et al. | |
| 6,983,188 B2 | 1/2006 | Loughran et al. | |
| 6,983,310 B2 | 1/2006 | Rouse et al. | |
| 7,580,862 B1 * | 8/2009 | Montelo et al. | 705/26.1 |
| 2002/0010615 A1 * | 1/2002 | Jacobs | 705/9 |
| 2002/0038233 A1 | 3/2002 | Shubov et al. | |
| 2003/0182413 A1 * | 9/2003 | Allen et al. | 709/223 |
| 2004/0039504 A1 * | 2/2004 | Coffee et al. | 701/35 |
| 2004/0216098 A1 * | 10/2004 | Roe et al. | 717/161 |
| 2005/0015292 A1 * | 1/2005 | Wilson et al. | 705/9 |
| 2005/0027580 A1 * | 2/2005 | Crici et al. | 705/8 |
| 2005/0108133 A1 * | 5/2005 | Balasubramanian et al. | 705/35 |
| 2005/0209885 A1 * | 9/2005 | Lamb et al. | 705/2 |
| 2006/0004604 A1 * | 1/2006 | White | 705/2 |
| 2006/0031110 A1 | 2/2006 | Benbassat et al. | |
| 2006/0031145 A1 | 2/2006 | Todd | |
| 2006/0117317 A1 * | 6/2006 | Crawford et al. | 718/104 |
| 2006/0188327 A1 * | 8/2006 | Moon | 403/325 |
| 2008/0313007 A1 * | 12/2008 | Callahan et al. | 705/9 |

OTHER PUBLICATIONS

PCT International Search Report and Written Opinion dated Feb. 27, 2008.

* cited by examiner

*Primary Examiner* — Rupal Dharia
*Assistant Examiner* — Mohammed Ahmed
(74) *Attorney, Agent, or Firm* — Orrick Herrington & Sutcliffe, LLP

(57) ABSTRACT

A system and method are disclosed for the creation of future time based search. Service providers identify their availability. This information is then searchable by potential clients to determine if relevant, local service providers are available to perform needed service.

8 Claims, 6 Drawing Sheets

Provider Search

[ ] Service 305

[ ] Location 315

[ ] 325

[ ] / [ ] / [ ] [ ] : [ ]   Start 335
Month Day Year Hour Min.

[ ] / [ ] / [ ] [ ] : [ ]   End 345
Month Day Year Hour Min.

Figure 3

SYSTEM AND METHOD FOR SERVICE PROVIDER SEARCH

FIELD OF THE INVENTION

The present invention is directed generally to apparatuses, methods, and systems for time based services searching. In particular, the invention pertains to the performance of internet searches to identify service providers who are available at certain future times.

BACKGROUND OF THE INVENTION

The Internet provides a number of recourses for identifying service providers, e.g., white pages listing or general internet searches. These services generally provide a mechanism to search for or browse relevant service providers, including limiting the search to your local area. For example, Google's "local.google.com" service allows a searcher to enter keywords and a location to find relevant services in a particular area. Services such as these are limited, however, in that once the provider is identified the user must contact each provider individually to determine if the service provider will be appropriate for the particular service required.

SUMMARY OF THE INVENTION

This disclosure details the implementation of apparatuses, methods, and systems for service provider identification searching. The disclosed systems, methods, and apparatuses provide mechanisms to allow users of the system to search for relevant service providers based on a number of criteria including keywords, service type, location, future availability, hourly rate, and skill levels. This fine grained approach for service reporting and identification increases a user's efficiency in conducting service searches.

Systems, methods, and apparatuses are disclosed for identifying service providers available at a future time. This is accomplished by receiving a service provider's name, service provided, physical location, rate, and availability information from the provider's web site or another source. This information is associated together and stored in a searchable database. With the database populated with similar information from a number of service providers, a search interface is provided. Through the search interface, potential clients submit requests for service provider identification that satisfy their requested future availability (including, routine availability), service type, and location criteria. Any matching results are communicated to the potential clients.

In a further embodiment, future availability information relating to one or more service providers is gathered and stored with associated service provider information describing characteristics of each service provider. In response to a search request, service providers matching a future time availability and at least one additional service provider characteristic are identified. The service providers matching the request are output.

In a further embodiment, future time availability browsing is provided. Information about the future time availability of service providers is gathered, stored, and associated with other information about the provider. User interface elements are provided for selecting a future time and a service provider characteristic. These interface elements generate an input upon which a search is conducted of the stored future availability and associated service provider characteristics. Any matches to the input are output for review.

In a further embodiment, the future availability of traveling providers, staff, or employees is tracked and used to update the service provider's overall availability. Traveling providers, staff, or employees provide information including their current location. This information along with the provider's availability is used to generate location specific future availability information. In this way, the availability information, or a staff calendar, can be more efficiently provided by showing earlier availability in locations near the provider and later availability for more distant locations, which require a longer travel time.

BRIEF DESCRIPTION OF THE DRAWINGS

The accompanying drawings illustrate various non-limiting, inventive aspects in accordance with the present disclosure:

FIG. 3 illustrates an embodiment of a search interface in accordance with the disclosed system.

DETAILED DESCRIPTION

In the following description of the various embodiments, reference is made to the accompanying drawings, which show by way of illustration various exemplary embodiments that practice the disclosed invention. It is to be understood that other embodiments may be utilized and structural and functional modifications may be made without departing from the scope of the present invention.

A representative problem that can be solved by employing the teachings of the disclosed invention is the search for a service provider to work in one's home, such as, for example, a plumber. In such a situation the individual requiring service will typically search their yellow pages, ask acquaintances for referrals, or search on the Internet. While each of these solutions might identify relevant providers, the person performing the search must still contact each of the providers identified and determine which are available at a time convenient for the searcher, whether the provider's rate is acceptable, and/or whether the provider has the appropriate skill or work quality requirements. This problem is particularly pronounced when searching electronic sources, such as the Internet, because the search will typically uncover numerous potential providers. Contacting each of the providers identified in the search and determining whether they are appropriate and available at the required time could become tedious.

Figure 1:
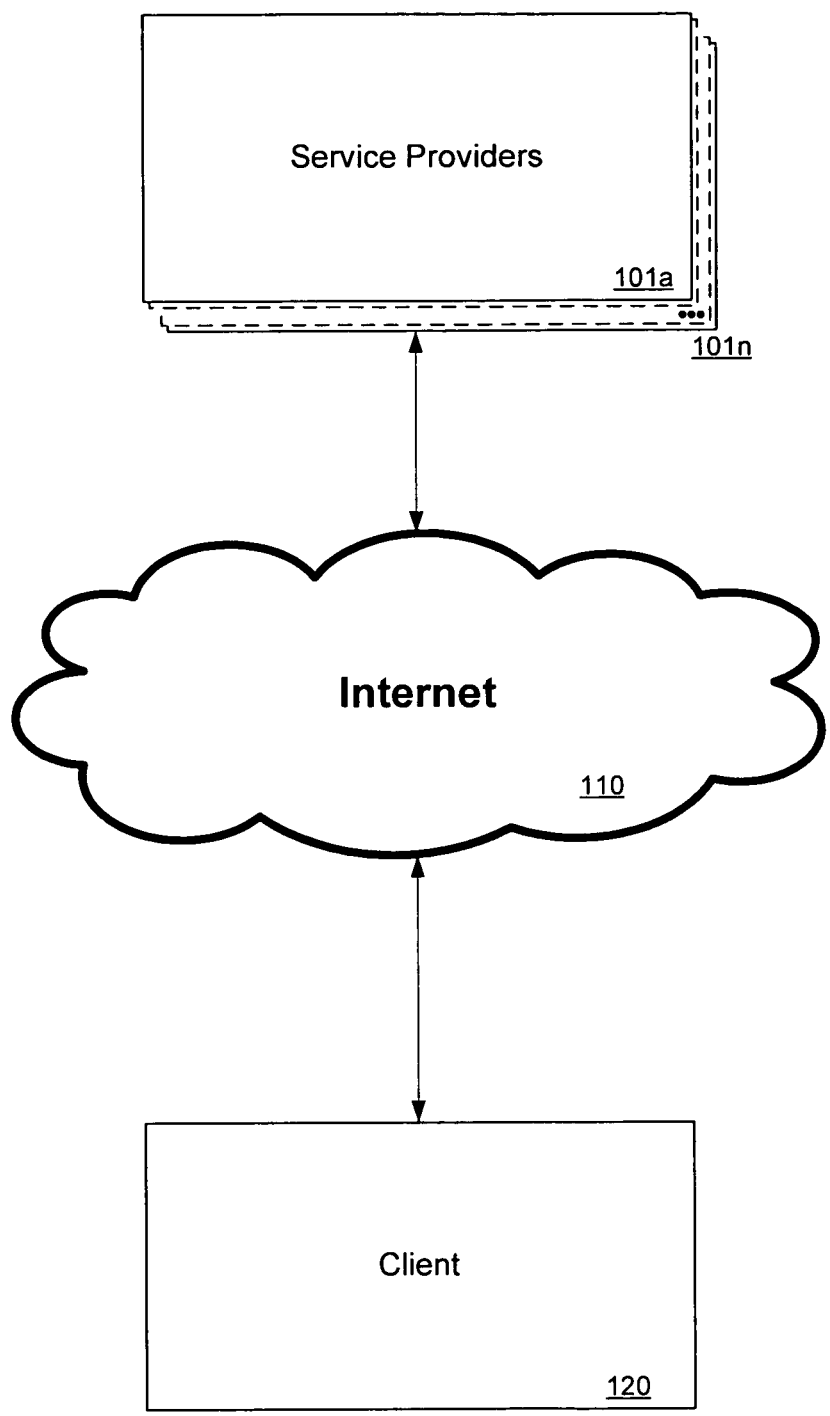
FIG. 1 illustrates an overview of one embodiment of the disclosed system.

The effort required to identify relevant and available service providers is greatly reduced by providing systems and methods for the service providers to identify the times at which they are available and allow their clientele to search based on those times. The systems and methods are particularly useful when they are standardized such that the searching can be done via a service aggregator site or general internet search engine, such as Google, Yahoo!, or AltaVista. For example, as shown in FIG. 1, an arbitrary number of service providers 101a-101n provide information about themselves via the Internet 110. This information could be, for example, a web page. The client 120 also connects to the Internet 110 and can, thereby, receive information from and optionally communicate with one or more of the service providers 101a-101n.

Using the structure shown in FIG. 1, service providers 101a-101n may create and provide Internet accessible information, such as web pages, providing information about their business, including the work they perform, their location, etc. Adding availability information, however, raises a number of issues. For example, a standardized method for representing availability should be adopted to enable efficient searching by potential clients. Otherwise, each service provider might create its own ad hoc system for representing its availability and clients would be unlikely to learn about and make use of the various systems. Adoption of a standard representation of future time availability, including, ranges of time, would allow the most widespread use of the system by potential clients. With a representation of future time availability established, potential clients will be able to format their searches to conform to the representation.

One basic approach for establishing a representation of future time availability would be to develop a common format for time representation to be used by service providers on their web pages or other information sources, such as, for example, internal databases or systems. For example, service providers could simply provide their availability as a space delimited plain text list in a convenient standardized format, such as for example, month/day/year/start_time-end_time. Note that precise format of the time identifier is not important and particular fields, such as year or end_time, could be expanded, excluded, or modified. Alternatively, the time identifier may include an end_time field indicating when the work must be finished without including a start_time. The availability information could, alternatively, be provided in more generic terms, such as morning, afternoon, or evening. The plain text time identifier information could simply be added, visibly or invisibly, to provider's existing on-line information. Potential clients could then include a corresponding string in their searches to locate available service providers because search sites would pick up and record the availability information just as they would any text information.

For example, a client living in Hometown, N.Y. seeking a local plumber who will be available to start on Jun. 10, 2006 between 9:00 and 10:00 a.m., could enter a search for: plumber Hometown Jun. 10, 2006/9:00-10:00. Plumbers in the area who have websites, or who have a network presence via some other service, would include their typical information—e.g. the fact that they provide plumbing services, where they are located, their telephone number, etc.—and a group of time availabilities in visible or invisible text. The benefit of invisible text is that it will be read by search engines without marring the look and design of the site. The information provided on the plumbers' websites would be cataloged by a search provider. The client's search would discover any plumbing service in, or around, Hometown that has identified itself as being available at the indicated time.

This approach has the advantage of requiring no additional infrastructure from search providers. As far as the search engines are concerned, the code "Jun. 10, 2006/9:00-10:00" is simply a string of information like any other word or number stored in its database. Accordingly, such a system could be established without any cooperation by search providers. The only requirement for its implementation is notifying service providers and clients of the proper format for listing and searching the date-based information. With that information, service providers can add information complying with the system to their sites and clients can search for information by conforming to that format.

One limitation of this approach is that the technique is somewhat rigid and would require the service provider and the client to exactly match their respective availability times and searches. For example, if the plumber in the previous example had recorded his availability as "Jun. 10, 2006/8:30-10:30" the potential client's search would not have uncovered this provider because there was not an identical match. This is true regardless of the fact that the plumber was clearly available during the period requested. Accordingly, a system in which the service provider's availability could be expressly identified as time information would allow more efficient identification of time availability and allow a more robust level of searching. Accordingly, the plain text searching just described would be most suitable for services that schedule their service in uniform time blocks. Barbers, for example, may benefit from such a system where they schedule appointments in uniform half-hour blocks.

Figure 2:
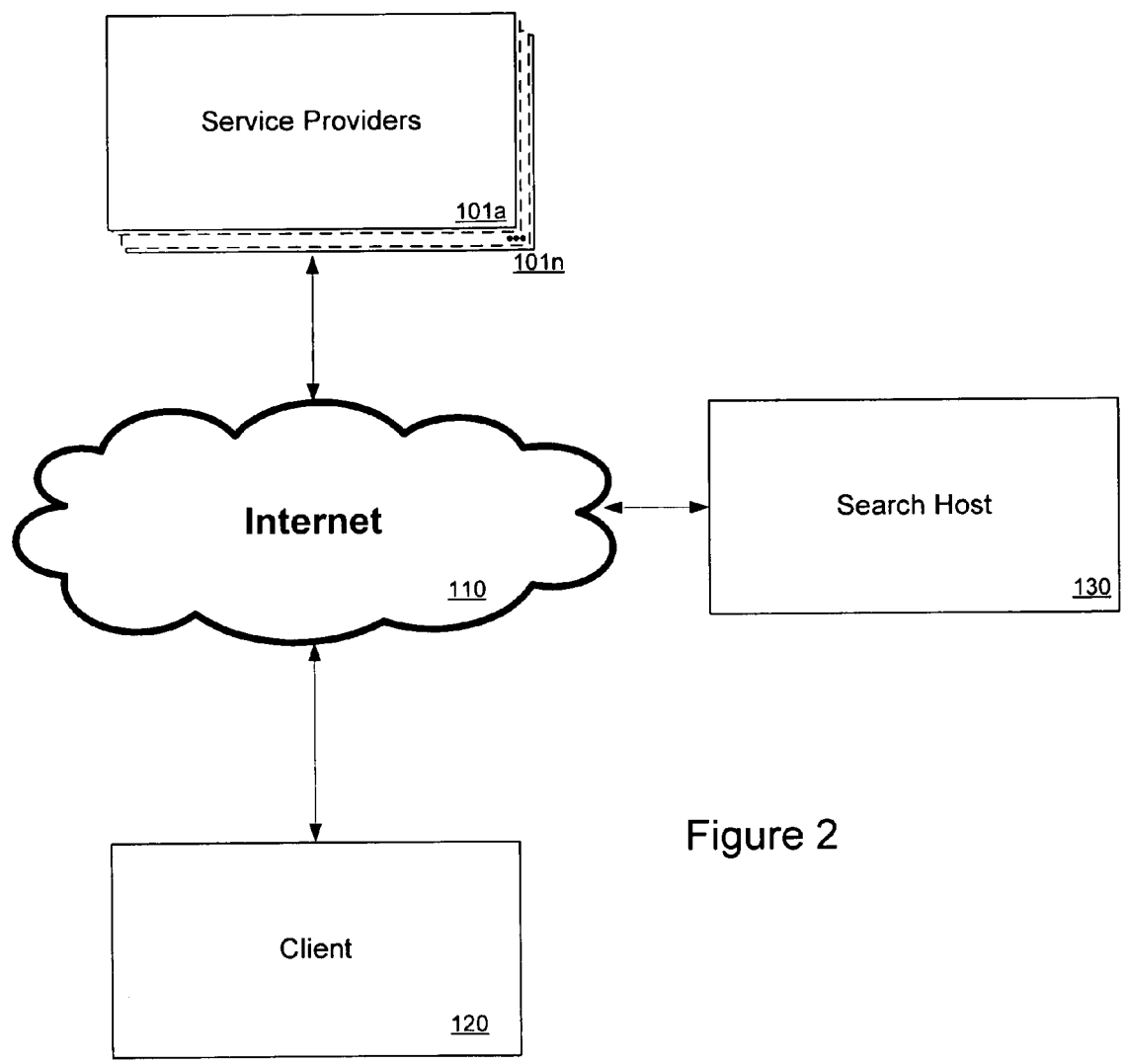
FIG. 2 illustrates an overview of another embodiment of the disclosed system.

FIG. 2 provides a schematic overview of participants in an embodiment of the disclosed system that allows more control in the identification and searching of service providers' future availability. Like the FIG. 1 embodiment, an arbitrary number of service providers 101a-101n provide information about themselves via the Internet 110 and potential clients 120 search for appropriate service providers. The FIG. 2 embodiment adds a search host 130 that participates somewhat more actively in the search process.

Specifically, in the FIG. 2 embodiment the service providers indicate their availability in a manner that makes the availability time quantities machine readable. In other words, the computers at the search host 130 can parse the service providers' information and store their availability as a time quantity, rather than a generic text string. This has the advantage of preventing the service provider from having to break up its time into discrete blocks when it identifies its availability. Accordingly, if a particular service provider is available all day it could list its availability as 8:00-18:00, even when the provider intends to perform a number of service calls that day. For example, if a potential client performed a search requesting availability from 9:00-9:45. Algorithms implemented by the search host would recognize that the provider's availability of 8:00-18:00, includes the 9:00-9:45 slot requested by the searching client.

The search host 130 could be operated by an existing internet search provider, an independent service provider search service, or a service that allows potential clients to browse service providers by service type and time. The search host 130 can be embodied, for example, with a web server accessible by potential client and containing a database detailing information, such as future availability and location, about various service providers.

As shown in FIG. 2, the search host 130 will be able to communicate with service providers 101a-101n to obtain information via the Internet 110 about the services they perform, their location, their rates, their skill level, and their availability. A potential client 120 can communicate with the search host 130 via the Internet 110, for example via a web interface, although any appropriate mechanism can be used. After receiving a query from a client, the search host can return details to the client regarding service providers matching the query. The client can then use the information returned by the search host 130 to contact the service provider 101.

In order for the search host to populate its database with the availability times for the service providers, a machine readable representation of the providers' availability must be provided. This could be accomplished by implementing text parsing and reading algorithms at the search host, which would interpret un-coded text on the service providers' sites.

Another approach would be for the service providers to code the time entries in a directly machine readable format. The search host could then communicate the service provider's system to retrieve the relevant information. One embodiment for accomplishing this would be to code time availability via XML with an appropriately defined schema. An exemplary XML encoding for "time availability" is provided below:

```
<TimeAvailability>
    <StartTime>
        <month> 12 </month>
        <day> 20 </day>
        <year> 2006 </year>
        <hour> 13 </hour>
        <minute> 00 </minute>
    </StartTime>
    <EndTime>
        <month> 12 </month>
        <day> 20 </day>
        <year> 2006 </year>
        <hour> 18 </hour>
        <minute> 00 </minute>
    </EndTime>
</TimeAvailability>
```

As shown above, this XML represents an availability on Dec. 20, 2006 at 1:00 p.m. through 6:00 p.m. Tags could also be provided to label time sets more loosely, such as morning, afternoon, evening, or every Tuesday, etc. Alternatively, machine readable coding schemes other than XML could be used. For example, the same information could be coded in JavaScript Object Notation (JSON) or any other suitable scheme. In addition, other information could be added to the availability information. Times could be labeled as available based on additional criteria. For example, a service provider might label a particular time a "maybe" available, "emergency" available, or "increased rate" available. In this way a service provider could indicate possible availability, or willingness to change its plans for a higher fee. Identifiers could also be added to indicate the level of security or privacy the service provider would like applied to the availability information. In one scenario, a tag might be added to indicate that the provider wants the date available for searching purposes, but not for viewing purposes. In this way, the service provider can show his availability without publicizing his working schedule.

The coded availability information would be added to the service provider's site, which in turn can be retrieved and stored by the search host to create the search host's database of service providers. Typically, the search host can periodically "crawl" the sites that it maintains in its database and record the relevant information. "Crawling" is the approach used by large search providers like Google to create their search database. In this way, the search host would not only record the typical search information, such as the website's keywords and location, but it would also record the service providers' future availability.

One potential issue with providing a service providers' future availability, is updating the information stored by the search host. For example, as a service provider's schedule fills up, availability times posted on its site will need to shorten. If, however, the search host has not been informed of the change the search host 130 will misreport the service provider's availability to clients. The extent of this information gap depends on how frequently the search host "crawls" the service providers' web sites. For sites that are heavily trafficked and frequently updated the search host would have to check for updates relatively frequently.

The updating problem can be solved by providing a mechanism for the service providers to update the search host of any change to their posted availability. This functionality can be implemented in a number of different ways. One approach would be for the service provider 101 to publish its availability using an RSS feed. RSS is a technology that provides an efficient mechanism for a content provider to notify its users of content updates. A search host 130 could subscribe to the service providers' availability RSS feeds and be informed of any changes to the service providers' availability. This will provide rapid updating of the search host's 130 availability database and ensure accurate results. In the alternative, a true push technology could be employed to directly update the search host with any changed information.

In other embodiments the service providers 101 might provide their availability information through a private link with the search host 130. In such an embodiment, one or more of the providers 101 would communicate directly with the search host 130 to exchange information about the providers' availability. This communication could occur via any known means, e.g., VPN, FTP, telephone, intranet, web connection with secure login, etc. The individual service providers may also log in directly to the search host to identify their availability.

FIG. 3 provides an example of an interface that search host 130 could create to implement the client side portion of the disclosed system by, for example, implementing these features in a web page. Text box 305 provides a place for the client to enter the type of service the client requires. Text box 315 provides a place for the client to enter the required location.

Start time entry 335 provides a place for the client to enter the starting time at which they would like the service to be performed. End time entry 345 provides a place for the client to enter the time at which the service may end, if necessary. Alternately, the system could accept just an end time entry without specifying the start time. The start and end times could also represent the time window in which the client needs the service provider to begin, rather than the time in which the service must begin and be completed. Or time could be displayed in pre-set intervals as available or unavailable. The user interface for the start and end times could also be implemented with a calendar-like interface for choosing days and/or a menu interface for choosing time. The time can also be stated more generically, such as every Thursday, Friday morning, all day Wednesday, etc.

Text box 325 can be used to record other criteria the client may require, such as cost, expertise, certifications, rating levels, etc. The data fields collected in the FIG. 3 interface are merely exemplary. Other information could optionally be collected and various elements in FIG. 3 could be excluded. In addition, the interface elements shown are also merely exemplary. Other suitable interface elements known in the art could alternatively be employed, such as a calendar interface to indicate dates, a pull down menu or map to indicate locations, etc.

Figure 4:
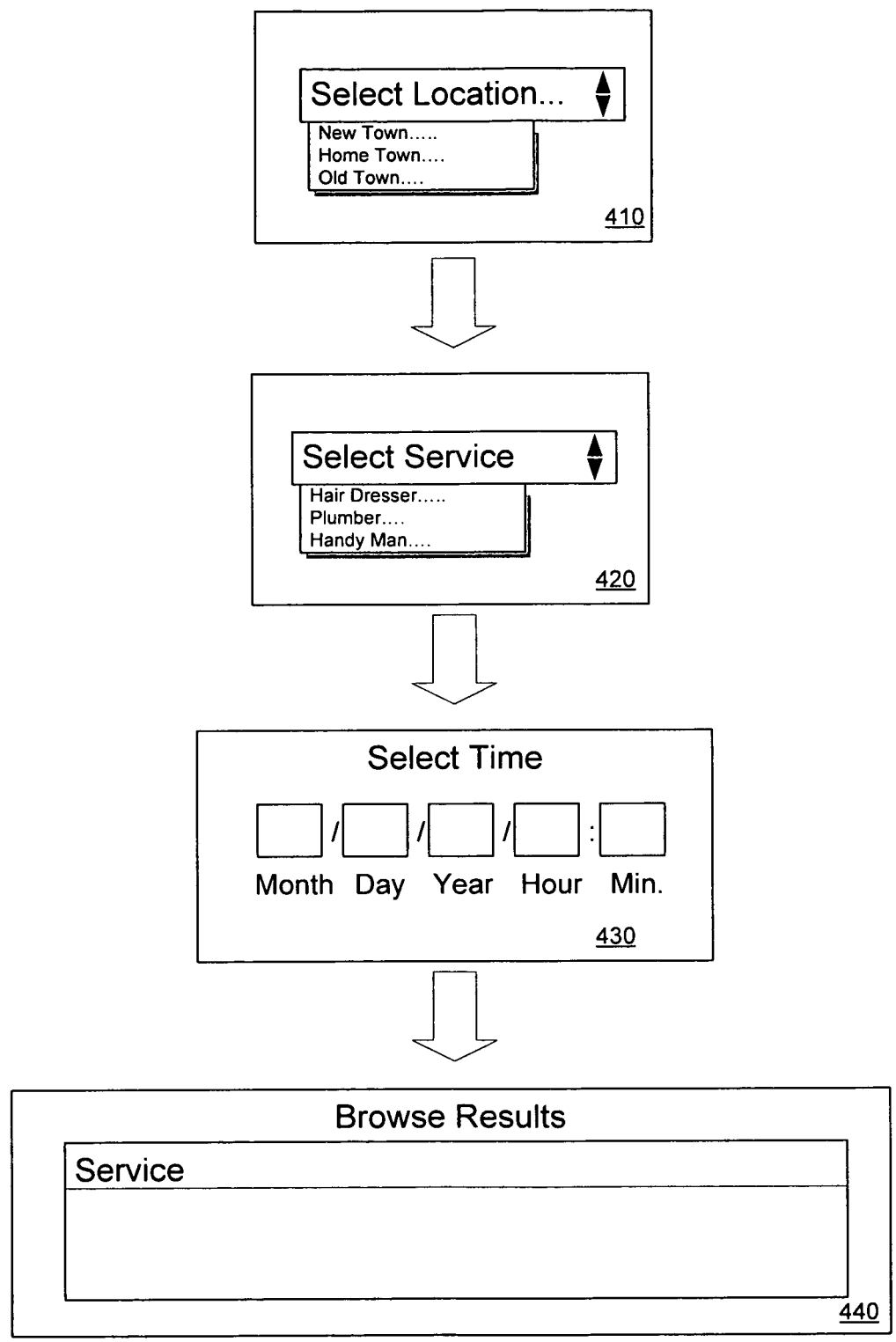
FIG. 4 illustrates an embodiment of a browse interface in accordance with the disclosed system.

The search host might also provide information about the available service providers with a browsing paradigm rather than search paradigm. An example of a browsing interface is shown in FIG. 4. In the FIG. 4 browsing example, the client would first be presented with a choice of location 410. Once a location has been input, the client would be presented with a choice of service types available for that location 420. With the service type selected, the select time interface would be provided 430. Once a requested time is entered, such as, for example, morning, afternoon, or evening, a browse results page 440 is provided and the client can review, examine, and/or contact available service providers. As with the search paradigm, various elements of the browsing interface example disclosed in FIG. 4 could be added to rearranged or deleted.

A further refinement of the system could allow service providers that travel over relatively long distances when servicing a particular geographical area to associate a particular availability time with a particular location. In this way, a service provider can efficiently notify potential clients that it will be available to perform service in a particular area. For example, if the service provider is going to be in Neartown in the early morning, it can associate its mid and late morning time slots with the Neartown location and perhaps fill those slots with other work in or near Neartown. Without such efficiencies, the service provider might have needed to identify itself as unavailable for a longer period of time to ensure it had enough travel time to reach its entire service area.

For example, if a handyman is working from 8:00 a.m. to 8:45 a.m. in Neartown he might identify himself as available at 9:00 a.m. for other work in Neartown, but unavailable in Fartown. If travel time from Fartown to Neartown takes one hour, the handyman's availability in Fartown will not begin until 10:00 a.m. In this way, if a client in Neartown needs work at 9:00 a.m. they can identify the provider who is in the area. Similarly, the service provider benefits from a more efficient use of its resources. This might also provide a situation where it would be advantageous to identify availability times more loosely, such as available in Fartown at about 10:00 a.m. or maybe 10:00 a.m. to account for variability in traffic, etc.

The tying together of the provider's location and schedule would also enable searches where the location is the primary criteria and the time is non-limiting. For example, certain specialized and/or maintenance oriented service providers might provide a means to search for the next time they will be in your area. In that way, a searcher might request service the next time the service provider, e.g., a gutter cleaner, driveway sealer, window cleaner, etc., is in her area.

Figure 5:
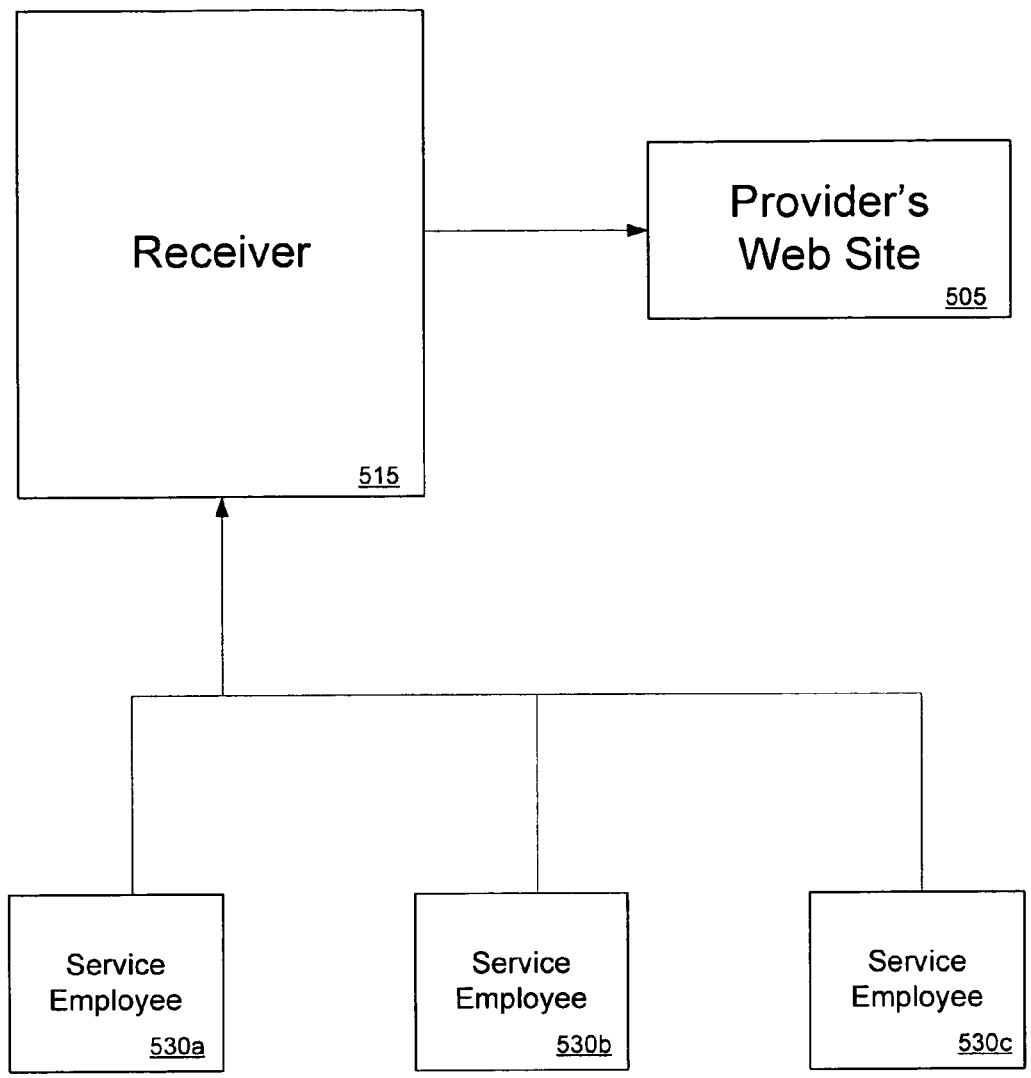
FIG. 5 illustrates an embodiment of a service employee location updater in accordance with the disclosed system.

FIG. 5 shows an exemplary embodiment that enables a service provider to track various service personnel and use that information to update the service provider's website with availability and location information. Specifically, service providers 530a-c, such as providers, staff, or employees of the service provider travel to perform their service for clients. While on duty, the service providers periodically notify a receiver 515 of their whereabouts. For example, at each job the service employee might send a message to the receiver indicating where the employee is along with an estimation of the amount of time the employee expects to remain at the particular job. The receiver 515 can use this information to update the service provider's availability posted on the provider's web site 505. The receiver 515 can be embodied by a person that receives information from the service providers and makes inputs to the system. In the alternative, the receiver 515 could be automated, such that it receives updated location information from the service providers electronically. For example, the service providers could send the receiver a signal via a electronic communications device incorporated with a positioning device, such as GPS. In a further alternative, the receiver could directly copy the relevant information from the service providers' personal digital assistants (PDA), laptop computers, cell phones, or any other analogous device.

Figure 6:
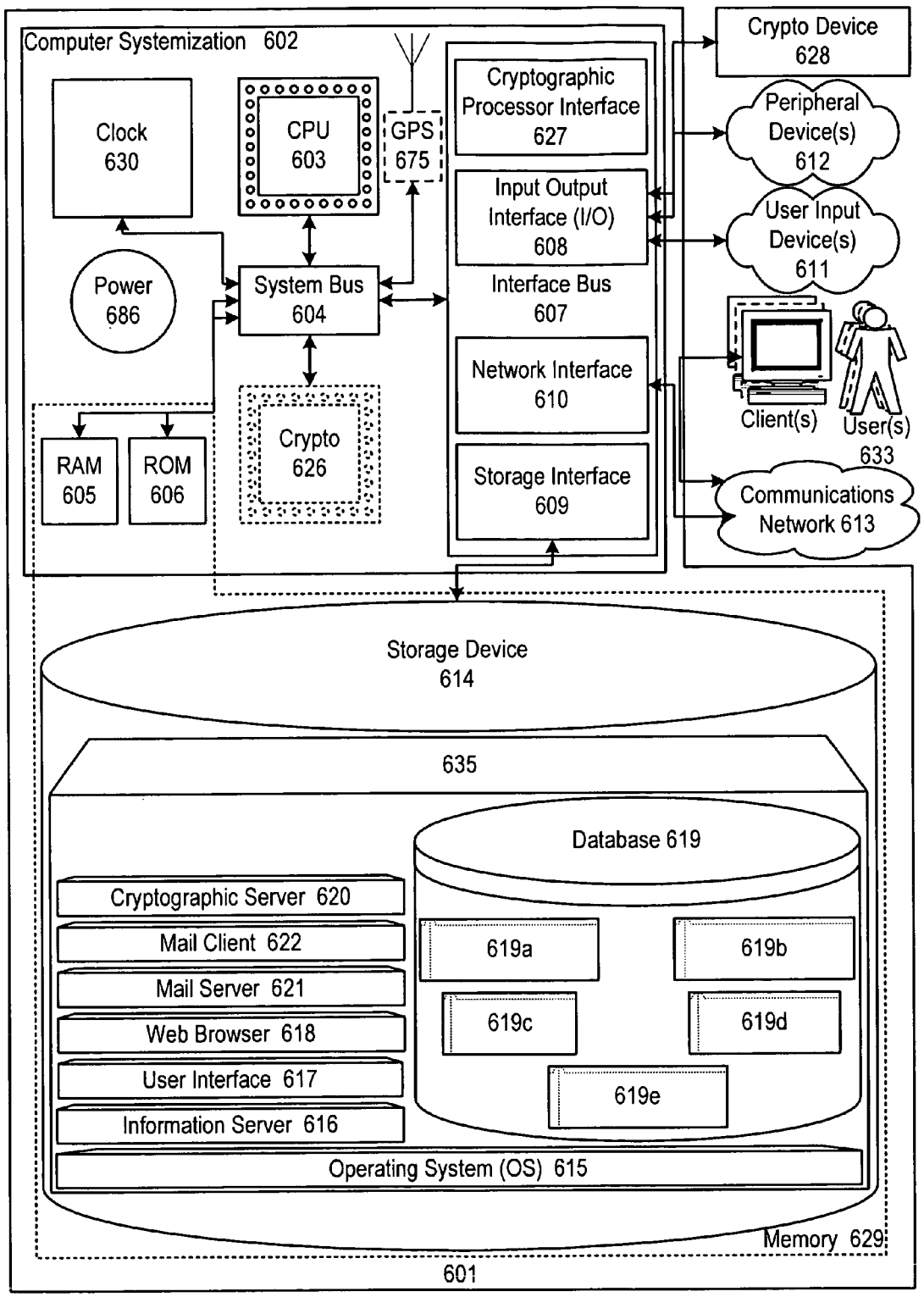
FIG. 6 illustrates a systemization diagram for an embodiment of the disclosed system.

FIG. 6 of the present disclosure illustrates inventive aspects of a time based search host 601 in a block diagram. In this embodiment, the time based search host 601 may serve to retrieve, store, search, serve, identify, instruct, generate, match, and/or update databases containing relevant service provider availability information and/or other related data. It should be noted that the client's device and the service provider may be comprised in a device similar to time based search host 601.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the time based search host 601 may be connected to and/or communicate with entities such as, but not limited to: one or more users from user input devices 611; peripheral devices 612; a cryptographic processor device 628; and/or a communications network 613.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A time based search host 601 may be based on common computer systems that may comprise, but are not limited to, components such as: a computer systemization 602 connected to memory 629.

Computer Systemization

A computer systemization 602 may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source 686. Optionally, a cryptographic processor 626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the time based search host controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 686 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the time based search host thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the time based search host 601 is accessible through remote clients 633*b* (e.g., computers with web browsers) by users 633. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 611 may be card readers, dongles, finger print readers, gloves, graphics tablets, joysticks, keyboards, mouse (mice), remote controls, retina readers, trackballs, trackpads, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the time based search host 601 may be embodied as an embedded, dedicated, and/or monitor-less (i.e., headless) device, wherein access would be provided over a network interface connection.

Cryptographic units such as, but not limited to, microcontrollers, processors 626, interfaces 627, and/or devices 628 may be attached, and/or communicate with time based search host controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that a the time based search host controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 629 may contain a collection of program and/or database modules and/or data such as, but not limited to: operating system module(s) 615 (operating system); information server module(s) 616 (information server); user interface module(s) 617 (user interface); Web browser module(s) 618 (Web browser); database(s) 619; cryptographic server module(s) 620 (cryptographic server); the time based search interface module(s) 635; and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities through a communications network, ROM, various forms of memory, and/or the like.

Operating System

The operating system module 615 is executable program code facilitating the operation of the time based search host controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. Basically, any current or future network connected operating system could also fulfill this role. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the time based search host controller to communicate with other entities through a communications network 613. Various communication protocols may be used by the time based search host 601 as a subcarrier transport mechanism for interaction, such as, but not limited to: multicast, TCP/IP, UDP, unicast, and/or the like.

Information Server

An information server module 616 is stored program code that is executed by the CPU. The information server may be a conventional Internet information server such as, but not limited to Apache Software Foundation's Apache, Microsoft's Internet Information Server, and/or the information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the time based search host controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "imyInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the time based search host database 619, operating systems, other program modules, user interfaces, Web browsers, and/or the like.

Access to the time based search host database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the time based search host. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the time based search host as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 618 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the time based search enabled nodes. The combined application may be nugatory on systems employing standard Web browsers.

Cryptographic Server

A cryptographic server module 620 is stored program code that is executed by the CPU 603, cryptographic processor 626, cryptographic processor interface 627, cryptographic processor device 628, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the time based search host may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable the time based search host module to engage in secure transactions if so desired. The cryptographic module facilitates the secure accessing of resources on the time based search host and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Time Based Search Host Database

The time based search host database module 619 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the time based search host database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the time based search host database is implemented as a data-structure, the use of the time based search host database 619 may be integrated into another module such as the time based search host interface 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

The Time Based Search Host

The time based search host interface 635 is stored program code that is executed by the CPU. The time based search host affects accessing, obtaining and the provision of information, services, transactions, and/or the like across various communications networks.

The time based search host interface 635 enables access of information between nodes may be developed by employing standard development tools such as, but not limited to: ANSI, Objective-C, C, C++, Apache modules, binary executables, database adapters, Java, JavaScript, mapping tools, procedural and object oriented development tools, PERL, Python, shell scripts, SQL commands, web application server extensions, WebObjects, and/or the like. In one embodiment, the time based search host server employs a cryptographic server to encrypt and decrypt communications. The time based search host module may communicate to and/or with other modules in a module collection, including itself, and/or facilities of the like. Most frequently, the time based search host interface 635 communicates with the time based search host database, operating systems, other program modules, and/or the like. The time based search host may contain, communicate, generate, obtain, and/or provide program module, system, user, and/or data communications, requests, and/or responses.

Distributed Time Based Search Host

The structure and/or operation of any of the time based search host controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the time based search host controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A system for identifying in-home service provider availability comprising:
   a data storage element;
   an input/output interface for receiving a service request comprising: a requested service type, a requested location, a requested quality rating, a requested skill level and a requested future in-home service appointment availability time, wherein the requested future in-home service appointment availability time describes a recurring periodic time interval;
   a processor connected in communication with the data storage element and the input interface;
   a plurality of in-home service provider records contained within the data storage element, each record comprising: a service provider identifier, a service provider type, future appointment availability information, future location information, an individual service provider quality rating, a service provider skill level and service provider fee information;
   an algorithm stored in the data storage element and executable by the processor that determines:
   (a) in-home service provider records from the plurality of in-home service provider records that have service types meeting the requested service type;
   (b) in-home service provider records from the plurality of in-home service provider records with service provider future availability information that meets the requested future in-home service appointment availability time, wherein the algorithm uses travel time between the service provider future location and the requested location to determine whether the in-home service provider is available to perform the requested service;
   (c) in-home service provider records from the plurality of in-home service provider records with individual service provider quality ratings and skill level that meet the requested quality rating and skill level;
   a list in-home service provider records from the plurality of in-home service provider records that meet all three determinations (a-c) above;
   wherein, the input/output interface is further configured to output the list and excluding providers that do not meet all three determinations (a-c).

2. The system of claim 1 wherein one or more of the service provider type, the future appointment availability information, the future location information, the individual service provider skill level, or the service provider fee information are derived from the text of web sites associated with the one or more in-home me service providers.

3. The system of claim 2 wherein the future in-home service appointment availability information of the one or more in-home service providers is stored in a machine-readable format.

4. The system of claim 3 wherein the machine-readable format is XML based.

5. The system of claim 1 wherein the future appointment availability information describes a range of suitable times.

6. The system of claim 1 wherein the requested future time in-home service appointment availability describes a regular time interval.

7. The system of claim 1 wherein the requested future time in-home service appointment availability describes a requested finish time by which the in-home service provider must be finished.

8. The system of claim 1 wherein the selection of the in-home service provider performed by the algorithm further uses service provider cost information.

* * * * *

UNITED STATES PATENT AND TRADEMARK OFFICE
CERTIFICATE OF CORRECTION

PATENT NO. : 8,825,736 B2
APPLICATION NO. : 11/376642
DATED : September 2, 2014
INVENTOR(S) : Bal Agrawal Page 1 of 1

It is certified that error appears in the above-identified patent and that said Letters Patent is hereby corrected as shown below:

In the Claims

In claim 2, line 47, between the words "in-home" and "service" delete the word "me".

Signed and Sealed this
Twenty-fifth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,825,736 B2                          Page 1 of 1
APPLICATION NO.   : 11/376642
DATED             : September 2, 2014
INVENTOR(S)       : Bal Agrawal It is certified that error appears in the above-identified patent and that said Letters Patent is hereby corrected as shown below:

In the Claims

Column 18, in claim 2, line 47, between the words "in-home" and "service" delete the word "me".

This certificate supersedes the Certificate of Correction issued November 25, 2014.

Signed and Sealed this
Twenty-third Day of December, 2014

Michelle K. Lee
*Deputy Director of the United States Patent and Trademark Office*